(12) United States Patent
Yoshii et al.

(10) Patent No.: US 7,866,965 B2
(45) Date of Patent: Jan. 11, 2011

(54) INNER GEAR BEING BIASED TO PUMP COVER DUE TO MESHING OF INNER AND OUTER GEARS

(75) Inventors: Kazuhiro Yoshii, Toyama (JP); Daisuke Kikukawa, Yokohama (JP)

(73) Assignee: JATCO Ltd, Fuji-shi (JP)

( * ) Notice: Subject to any disclaimer, the term of this patent is extended or adjusted under 35 U.S.C. 154(b) by 929 days.

(21) Appl. No.: 11/783,150

(22) Filed: Apr. 6, 2007

(65) Prior Publication Data

US 2007/0248482 A1    Oct. 25, 2007

(30) Foreign Application Priority Data

Apr. 7, 2006    (JP)    ............... 2006-106545

(51) Int. Cl.
*F01C 19/10*    (2006.01)
*F03C 2/00*    (2006.01)
*F04C 4/00*    (2006.01)

(52) U.S. Cl. ................. 418/131; 418/132; 418/171; 418/181; 475/296; 192/3.28

(58) Field of Classification Search ............... 418/15, 418/131, 132, 166, 170, 171, 181; 180/65.2, 180/65.3, 65.4; 475/296; 192/3.28, 3.31–3.33

See application file for complete search history.

(56) References Cited

U.S. PATENT DOCUMENTS

| 3,695,791 | A | * | 10/1972 | Brundage | ............... 418/131 |
| 5,759,013 | A | * | 6/1998 | Miyazaki et al. | ............... 418/15 |
| 6,758,786 | B2 | * | 7/2004 | Lepelletier | ............... 475/296 |
| 7,445,438 | B2 | * | 11/2008 | Ronk et al. | ............... 418/171 |
| 2004/0045752 | A1 | * | 3/2004 | Omote et al. | ............... 180/65.2 |
| 2005/0210971 | A1 | * | 9/2005 | Satoh | ............... 73/118.1 |

FOREIGN PATENT DOCUMENTS

JP    2003-172269 A    6/2003

* cited by examiner

*Primary Examiner*—Theresa Trieu
(74) *Attorney, Agent, or Firm*—Foley & Lardner LLP

(57) ABSTRACT

A gear pump has a pump housing formed with a gear receiving recess, a pump cover coupled with the pump housing to cover the gear receiving recess, a hydraulic passage that uses the gear receiving recess as a passage part thereof, and annular inner and outer gears operatively installed in the gear receiving recess. The inner and outer gears are of a bevel type and meshed with each other in such a manner as to bias the inner gear in a direction to reduce the thickness of the passage part when the inner gear is rotated while turning the outer gear therearound.

12 Claims, 9 Drawing Sheets

INVENTION

REFERENCE-1

REFERENCE-2

REFERENCE-3

INNER GEAR BEING BIASED TO PUMP COVER DUE TO MESHING OF INNER AND OUTER GEARS

BACKGROUND OF THE INVENTION

1. Field of the Invention

The present invention relates in general to pumps for pumping a hydraulic fluid and more particularly to oil pumps of an internal gear type, that are installed in an automotive automatic transmission.

2. Description of the Related Art

As is known, the oil pump of internal gear type (which will be called "gear pump" hereinafter) generally comprises an inner gear as a drive gear that has external teeth, an outer gear as a driven gear that has internal teeth, and a pump housing and a pump cover that are coupled to house therein both the inner and outer gears. Upon assembly, a pump chamber is defined between some of the external teeth of the inner gear and some of the internal teeth of the outer gear. The inner gear is secured at a center opening thereof to a driving shaft to be driven by the same. In operation, the inner gear is driven by the driving shaft while turning the outer gear therearound, and thus the pump chamber is subjected to a volume change thereby pumping the oil through inlet and outlet ports.

In the gear pumps as mentioned hereinabove, there is a type in which the pump cover is formed with a recess at a position that faces one side surface of the inner gear, so that there is formed an oil passage that extends from the pump cover, the recess, the center opening of the inner gear and an external part of the pump housing. In case wherein the gear pump is installed in an automotive automatic transmission, the driving shaft for driving the inner gear is formed with an axially extending oil passage for supplying a torque converter with a hydraulic or operating fluid. For ease of understanding, such oil passage will be referred to as a "torque converter pressure passage" hereinafter.

Between the pump cover and the pump housing, there is defined a pocket for housing therein both the inner and outer gears. The thickness of the pocket is somewhat greater than the face width of each tooth of each gear. Thus, between each side surface of the inner gear or outer gear and each inner surface of the pump cover or pump housing except the area where the inlet and outlet ports for the operating fluid are provided, there is defined a very thin clearance.

As is known, the operating fluid that is highly compressed by the pump is discharged to the outside of the pump through the outlet port. However, during this discharging, part of the operating fluid is forced to leak through the above-mentioned very thin clearance. The clearance between the pump cover and the inner gear is in communication with the torque converter pressure passage 8 showing the low pressure, and thus, part of the hydraulic pressure produced by the pump is led to such low pressure passage 8, which means a leak of the operating fluid. It has been revealed that the amount of the leak is proportional to the cube of the size of the clearance.

Due to provision of such clearance through which the leak of the operating fluid is caused, the pumping power of the pump is lowered, which brings about various drawbacks particularly when the pump is installed in the automatic transmission. That is, when such pump is practically installed in the transmission for feeding a hydraulic system of the transmission with a controlled hydraulic pressure, the inlet/outlet balance of the operating fluid becomes poor. That is, the amount of fluid that is to be fed to engaging elements of the transmission, such as clutches, brakes and the like, tends to show a shortage by the amount of the leak. Of course, in this case, the engaging elements fail to operate normally.

For eliminating or minimizing the leak, one method has been hitherto proposed in which the face width of each tooth of each gear is increased to minimize the thickness of the clearance that causes the leak. However, in this case, increase in weight of each gear is induced and thus the torque needed for driving the pump is inevitably increased, which causes undesired increase of fuel consumption of the engine. Furthermore, due to increase of size of the pump, the transmission having the pump installed therein fails to have a compactness.

Japanese Laid-open Patent Application (tokkai) 2003-172269 shows a gear pump that is improved in minimizing the leak. For the improvement, measures are applied to the pump for providing axial faces of each gear with a balanced hydraulic pressure. For achieving this, there are formed grooves on respective inner surfaces of the pump housing and pump cover or on the axial faces of each gear.

SUMMARY OF THE INVENTION

However, even the technique suggested by the above-mentioned Japanese Laid-open Patent Application fails to bring about a satisfied improvement in reducing the leak. That is, for example, the technique does not provide a measure by which the amount of leak is intentionally and selectively controlled. Of course, the leak may be reduced by increasing the flatness of the clearance. However, this technique tends to increase the cost of the pump.

Accordingly, an object of the present invention is to provide a gear pump which is free of the above-mentioned drawbacks.

According to the present invention, there is provided a gear pump including an inner gear of which inner bore constitutes a part of an oil passage that extends from a hydraulic pressure control unit to an interior of a torque converter, which is characterized in that the amount of leak of oil to the oil passage is intentionally and effectively reduced.

In accordance with a first aspect of the present invention, there is provided a gear pump which comprises a pump housing formed with a gear receiving recess; a pump cover coupled with the pump housing to cover the gear receiving recess; a hydraulic passage that uses the gear receiving recess as a passage part thereof; and annular inner and outer gears installed in the gear receiving recess and meshed with each other in such a manner as to bias the inner gear in a direction to reduce the thickness of the passage part when the inner gear is rotated while turning the outer gear therearound.

In accordance with a second aspect of the present invention, there is provided a gear pump which comprises a pump housing formed with a gear receiving recess; a pump cover coupled with the pump housing to cover the gear receiving recess; an annular inner gear rotatably received in the gear receiving recess, the annular inner gear having bevel external teeth formed therearound, the annular inner gear having axially opposed first and second annular surfaces which face inner surfaces of the pump housing and pump cover, respectively, the second annular surface having an area that is larger than that of the first annular surface; an annular outer gear rotatably received in the gear receiving recess while receiving therein the annular inner gear, the annular outer gear having bevel internal teeth part of which is meshed with part of the bevel external teeth of the annular inner gear to constitute therebetween a volume changing pump chamber, the annular outer gear having axially exposed third and fourth annular surfaces which face the inner surfaces of the pump housing and pump cover, respectively, the fourth annular surface having an area that is smaller than that of the third annular surface; an inlet port exposed to the volume changing pump chamber to feed the same with a fluid; an outlet port exposed to the volume changing pump chamber to discharge the fluid therefrom; and a passage adapted to connect a hydraulic pressure control unit and a hydraulic pressure using device, that passage having one end exposed to a clearance defined between the second annular surface of the inner gear and the inner surface of the pump cover.

In accordance with a third aspect of the present invention, there is provided a gear pump installed between a torque converter and a speed change mechanism of an automatic transmission, which comprises a pump housing formed with a gear receiving recess; a pump cover coupled with the pump housing to cover the gear receiving recess; an annular inner gear rotatably received in the gear receiving recess, the annular inner gear being connected to an impeller shell of the torque converter through a pump driving hollow shaft, the annular inner gear having bevel external teeth formed therearound, the annular inner gear having axially opposed first and second annular surfaces which face inner surfaces of the pump housing and pump cover, respectively, the second annular surface having an area that is larger than that of the first annular surface; an annular outer gear rotatably received in the gear receiving recess while receiving therein the annular inner gear, the annular outer gear having bevel internal teeth part of which is meshed with part of the bevel external teeth of the annular inner gear to constitute therebetween a volume changing pump chamber, the annular outer gear having axially opposed third and fourth annular surfaces which face the inner surfaces of the pump housing and pump cover, respectively, the fourth annular surface having an area that is smaller than that of the third annular surface; an inlet port exposed to the volume changing pump chamber to feed the same with a fluid; an outlet port exposed to the volume changing pump chamber to discharge the fluid therefrom; and a torque converter pressure passage that extends between a work chamber of the torque converter and a control valve unit, the torque converter pressure passage having an open end that is exposed to a clearance between the second annular surface of the inner gear and the inner surface of the pump cover.

Other objects and advantages of the present invention will become apparent from the following description when taken in conjunction with the accompanying drawings, in which.

DETAILED DESCRIPTION OF THE INVENTION

Figure 1:
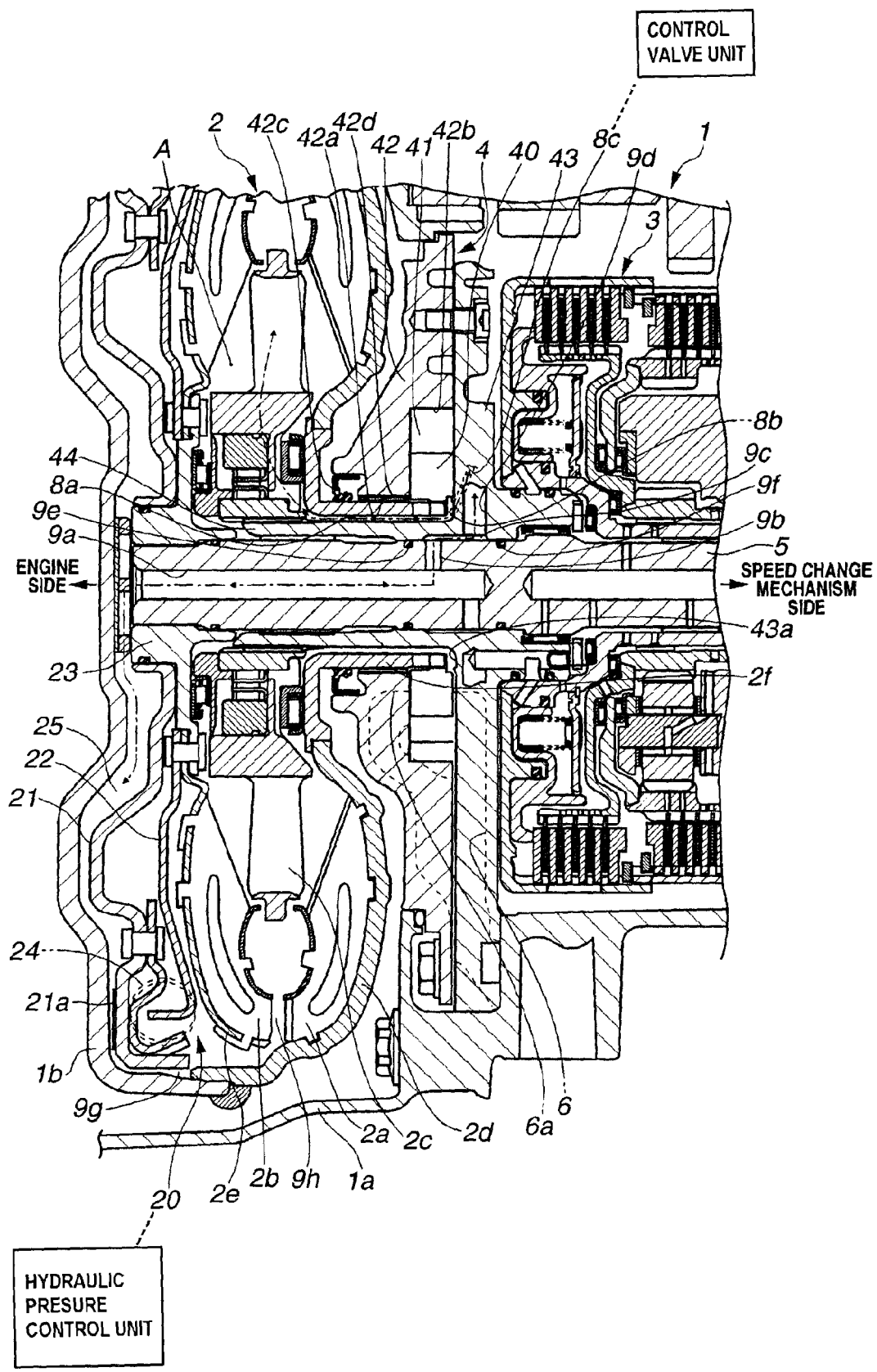
FIG. 1 is an axially sectioned view of a front part of an automotive automatic transmission to which a gear pump according to the present invention is practically applied.

Referring to FIG. 1 of the drawings, there is shown in a sectional manner an automotive automatic transmission 1 to which a gear pump of the invention is practically applied.

The transmission 1 generally comprises a torque converter 2 that transmits a torque from an engine (not shown) to an input shaft 5 of the transmission while multiplying the same and a speed change mechanism 3 that establishes a desired speed of the transmission by engaging and/or disengaging various elements of planetary gear units through clutches and brakes. The transmission 1 further comprises the gear pump 4 of the invention, a control valve unit and a coil cooler (not shown). As will be described in detail hereinafter, the pump 4 functions to feed various portions with a pressurized operating fluid.

As shown in FIG. 1, the torque converter 2 generally comprises a pump impeller 2a connected to an output shaft of the engine, a turbine runner 2b connected to the input shaft 5 of the transmission and a stator 2c that rectifies the fluid in the torque converter 2.

A lock up mechanism is provided in the torque converter 2. That is, a lock-up clutch 20 is installed in the torque converter 2. As will be described in detail hereinafter, the lock up clutch 20 and a lock up control valve 50 are combined to constitute the lock up mechanism. Under a given condition, the lock up clutch 20 is engaged to directly connect the engine output shaft to the transmission input shaft 5. Thus, under this condition, the torque of the engine output shaft is directly transmitted to the transmission input shaft 5 without being multiplied.

The lock up clutch 20 comprises a lock up piston 21, a contact plate 22, a clutch hub 23 and damper springs 24. Between the lock up piston 21 and a converter cover 1b, there is defined a lock up piston chamber 25. The clutch hub 23 is connected to the transmission input shaft 5 via a spline connection. To the clutch hub 23, there are connected a turbine runner shell 2e and the contact plate 22. One end of each damper spring 24 is connected to the contact plate 22 and the other end of each spring 24 is connected to the lock up piston 21. The lock up piston 21 is provided with a facing 21a.

When, upon discharge of the operating fluid from the lock up piston chamber 25, the internal pressure of an enclosed side in which the turbine runner 2b and the stator 2c are provided becomes hither than the hydraulic pressure in the lock up piston chamber 25, the clutch hub 23 and the lock up piston 21 are shifted toward the engine pressing the facing 21a against the converter cover 1b. With this, the lock up clutch 20 becomes engaged and thus the engine output shaft (or converter cover 1b) and the transmission input shaft 5 are directly connected. Upon this direct connection, the damper springs 24 function to suppress or minimize a transmission of torque fluctuation from the engine to the transmission input shaft 5.

The gear pump 4 of the invention is arranged between the torque converter 2 and the speed change mechanism 3. A pump driving shaft 2f that is connected to an after-mentioned inner gear 40 is integrally connected with the impeller shell 2d of the torque converter 2, and thus driven by the engine.

The gear pump 4 comprises an inner gear 40 as a drive gear that has external teeth, an outer gear 41 as a driven gear that has internal teeth, a pump housing 42 and a pump cover 43 that are combined to house therein both the inner and outer gears 40 and 41, the pump driving hollow shaft 2f and a stator shaft (no numeral). The inner gear 40 has a center opening (viz., shaft portion) connected to the pump driving shaft 2f by a key. Between the external teeth of the inner gear 40 and the internal teeth of the outer gear 41, there is defined a pump chamber. In operation, the inner gear 40 is driven by the pump driving shaft 2f, and thus the pump chamber is subjected to a volume change thereby to pump the operating fluid (or oil) through inlet and outlet ports.

The pump housing 42 and the pump cover 43 are united by means of connecting bolts and connected to a transmission case 1a. The pump housing 42 is formed with a circular opening 42a through which the pump driving shaft 2f passes. The pump housing 42 is formed, at a surface portion thereof that contacts the pump cover 43, with a gear receiving recess 42b that houses therein both the inner and outer gears 40 and 41 while surrounding the circular opening 42a. Between the circular opening 42a and the pump driving shaft 2f, there are arranged an oil seal 42c and a bush 42d.

The pump cover 43 is integrally formed with a stator shaft 44 that houses therein the transmission input shaft 5. The stator shaft 44 extends from the pump cover 43 toward the engine while running in the pump driving shaft 2f. To one end of the stator shaft 44 that is directed toward the engine, there is connected the stator 2c.

A torque converter pressure passage 8 is provided. This passage 8 is an oil passage for conveying a controlled operating fluid from a control valve unit to the torque converter 2 and conveying (or discharging) the operating fluid from the torque converter 2 to the control valve unit.

The pump cover 43 is formed with a passage part 8c of the torque converter pressure passage 8. The passage part 8c has a radially outer end that is communicated with the control valve unit and a radially inner end 8b exposed to the outside of the pump cover 43 and connected to an after-mentioned passage part 8a of the torque converter pressure passage 8.

The radially inner end 8b of the passage part 8c is positioned near a base portion of the stator shaft 44. More specifically, the radially inner end 8b is provided on a ring part 43a that surrounds the base portion of the stator shaft 44 that extends from the pump cover 43. As shown, the ring part 43a faces an end of the pump driving shaft 2f.

Between the pump driving shaft 2f and the stator shaft 44, there is defined the part 8a of the torque converter pressure passage 8. The passage part 8a has one end (viz., left end in FIG. 1) communicated with a space "A" in the torque converter 2 that is surrounded by the impeller shell 2d and the turbine runner is shell 2e and the other end (viz., right end in FIG. 1) communicated with the part 8c of the torque converter pressure passage 8.

A lock up pressure passage 9 is provided, which is a passage for supplying/discharging an operating fluid for the lock up clutch 20. More specifically, the lock up pressure passage 9 is for supplying a controlled hydraulic pressure from the control valve unit to a lock up piston chamber 25 and discharging the hydraulic pressure from the lock up piston chamber 25 to the control valve unit. The input shaft 5 of the transmission is formed with an axially extending passage 9a that forms a part of the lock up pressure passage 9. The axially extending passage 9a is formed with a radially extending part 9b.

The part 9a of the lock up pressure passage 9 has one end communicated with the lock up piston chamber 25 and the other end connected with one end of the lock up pressure passage part 9b. The other end of the pressure passage part 9b is connected with a port 9c that is provided outside of the input shaft 5 of the transmission. The port 9c is defined between the transmission input shaft 5 and the pump cover 43 (or stator shaft 44), and provided with seal rings 9e and 9f to be hermetically sealed.

The pump cover 43 is provided with a part 9d of the lock up pressure passage 9. The passage part 9d has a radially outside end communicated with the control valve unit and a radially inside end communicated with the port 9c.

Figure 2:
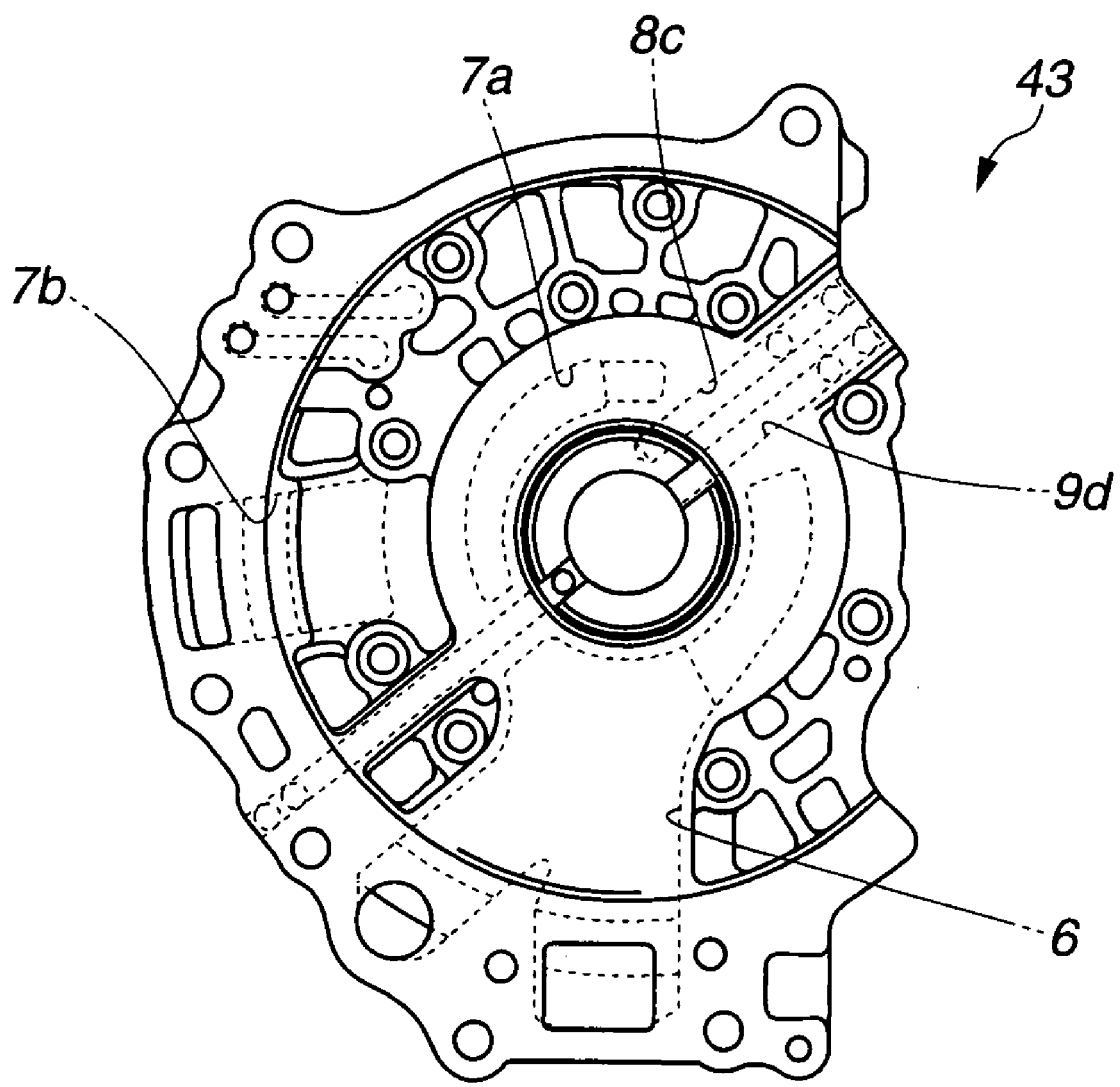
FIG. 2 is a view of a pump cover that is taken from the side of a speed change mechanism.

FIG. 2 is a view of the pump cover 43 taken from the side of the speed change mechanism 3. As shown, the pump cover 43 is formed with the part 8c of the torque converter pressure passage 8 and the part 9d of the lock up pressure passage 9.

Figure 3:
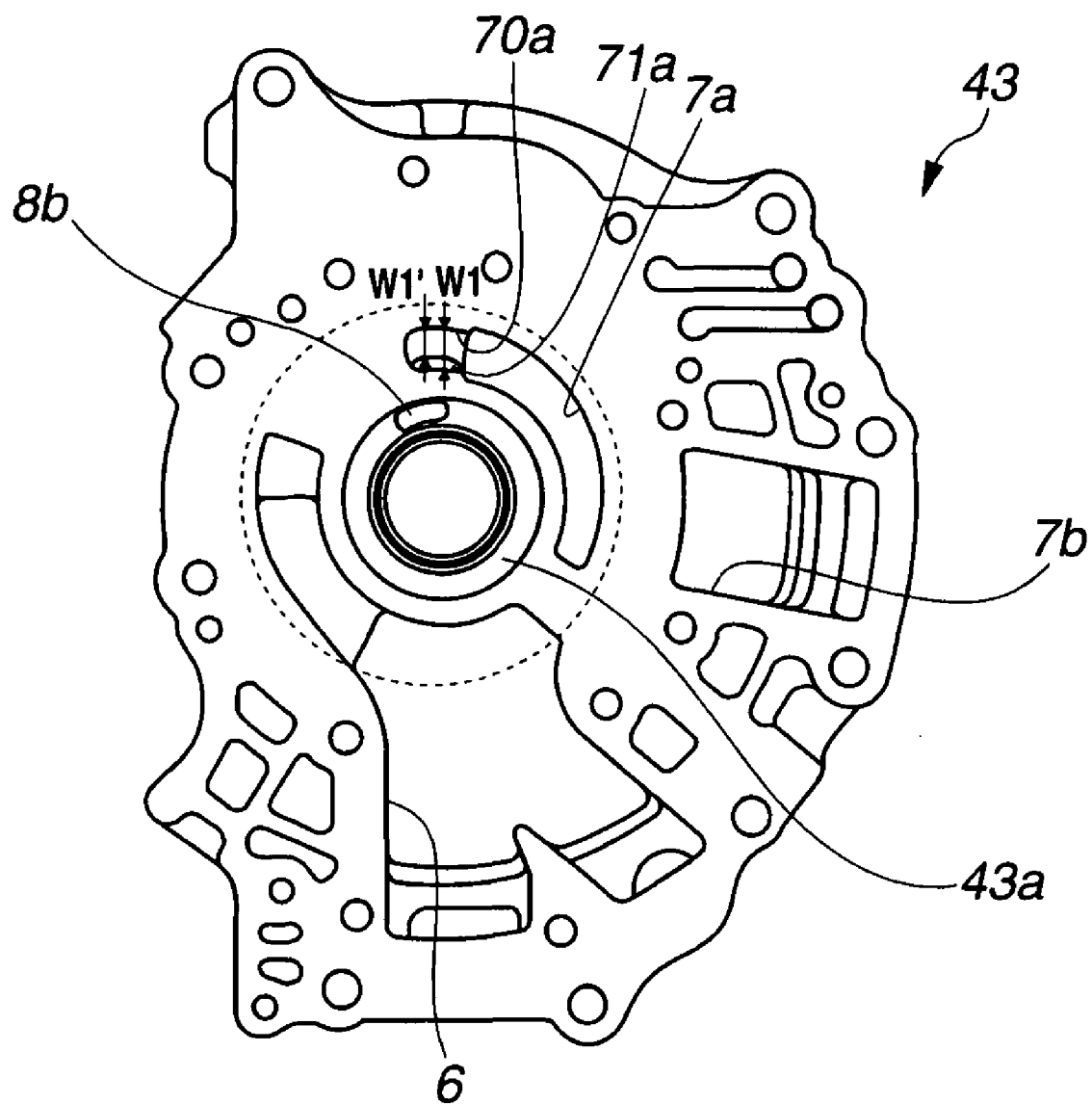
FIG. 3 is a view of the pump cover that is taken from the side of an engine.

FIG. 3 is a view of the pump cover 43 taken from the side of the engine. In the drawing, the position where the outer gear 41 is located is indicated by a broken line. On the ring part 43a positioned to face the end of the pump driving shaft 2f, there is provided the radially inner end 8b of the part 8c of the torque converter pressure passage 8.

The pump cover 43 is formed at the engine side with an inlet port 6 and outlet ports 7a and 7b. The inlet port 6 is a port for receiving into the pump 4 the operating fluid from an oil reservoir (not shown) and communicated with a gear meshing portion where the inner gear 40 and the outer gear 41 are meshed. The outlet ports 7a and 7b are ports for supplying the operating fluid from the pump 4 to certain portions of the control valve unit. The outlet port 7a is communicated with the gear meshing portion, and the other outlet port 7b is communicated with the outlet port 7a.

Figure 4:
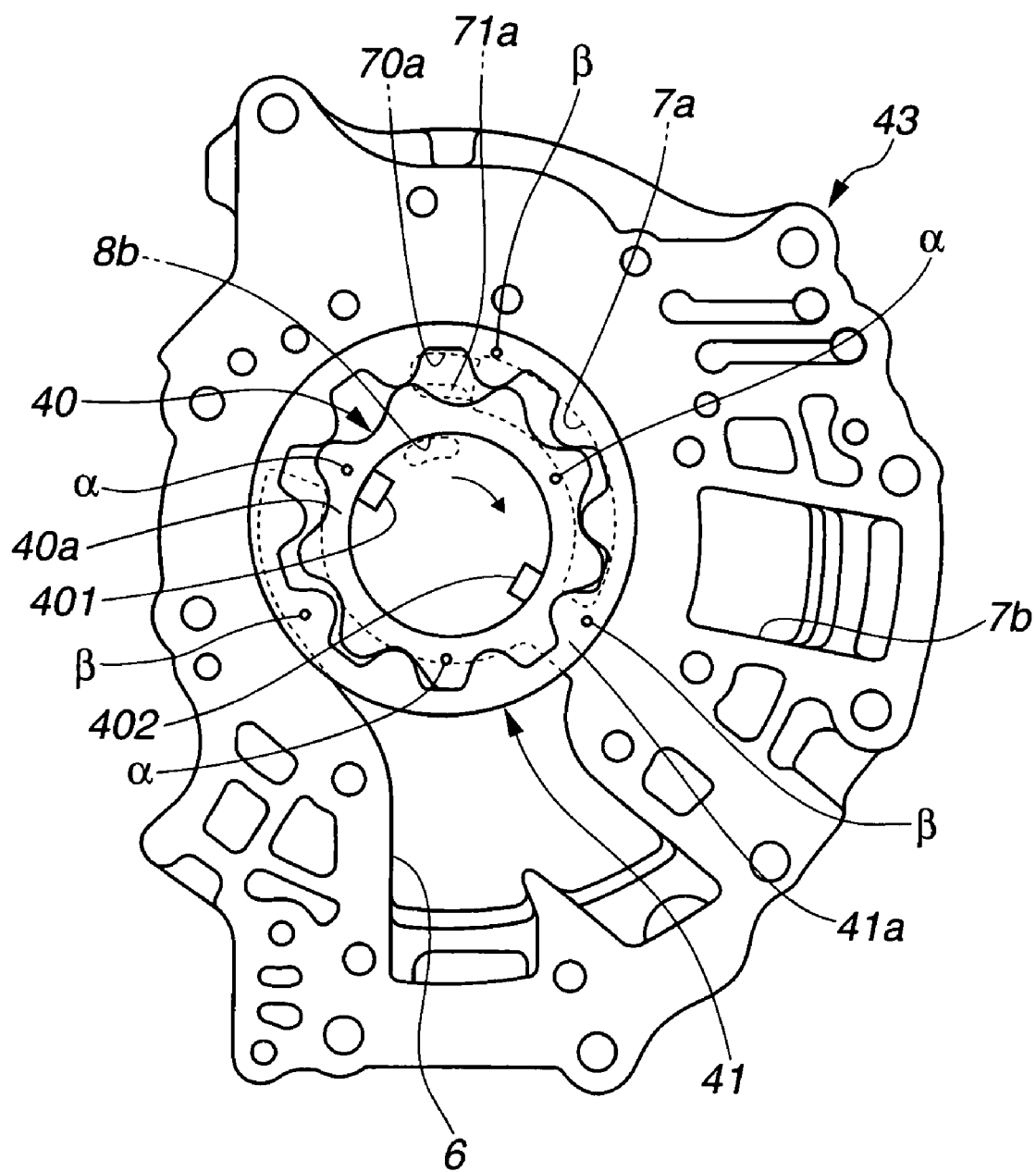
FIG. 4 is an inside view of the gear pump of the invention, that is taken from the side of the engine with a pump housing removed.

In the following, a leak of the operating fluid from the gear pump 4 to the torque converter pressure passage 8, that takes place under operation of the pump 4, will be briefly described with reference to FIG. 4 that shows an interior of the pump 4 with the pump housing 42 removed.

As shown, the outer gear 41 is rotatably received in the gear receiving recess 42b of the pump housing 42 (see FIG. 1). A rotation center of the outer gear 41 and that of the pump driving shaft 2f are displaced from each other. The inner gear 40 are connected to the pump driving shaft 2f through keys 401 and 402 to rotate together concentrically. Thus, the inner gear 40 is rotated in the direction of the arrow in FIG. 4 (viz., in a clockwise direction of the drawing) while being kept eccentric relative to the outer gear 41.

The meshing portion between the inner gear 40 and the outer gear 41 near the outlet port 7a has a pump chamber of which volume becomes small when the inner and outer gears 40 and 41 rotate. Thus, the operating fluid in the pump chamber is compressed and thus highly pressurized operating fluid is discharged from the outlet ports 7a and 7b. While, at a portion near the inlet port 6, the pump chamber becomes large in volume is when the inner and outer gears 40 and 41 rotate. Accordingly, the operating fluid in that portion becomes decompressed and thus the operating fluid is sucked into the pump 4 from the inlet port 6.

As will be described in detail hereinafter, the operating fluid discharged from the gear pump 4 is decompressed when it flows through a pressure regulator valve (not shown) and a torque converter relief valve and then regulated to a torque converter pressure for the torque converter 2. Thus, the pump chamber in the vicinity of the outlet port 7a is highly compressed and the pump chamber in the vicinity of the torque converter pressure passage 8 is lowly compressed.

Because of such pressure difference between the highly compressed and lowly compressed portions of the pump chamber, the operating fluid is forced to flow from the portion near the outlet port 7a toward the torque converter pressure passage 8, that is, toward the ring part 43a where the radially inner end 8b is provided (see FIG. 3), which is a leak of the operating fluid.

The amount of the leak is increased with increase in size (or thickness) of the clearance between the inner gear 40 and the pump cover 43, and proportional to the cube of the size of the clearance.

In the following, a lock up control valve 50 will be described with reference to FIGS. 5 and 6. The lock up control valve 50 functions to control engage/disengage of the lock up clutch 20.

The pressurized operating fluid discharged from the pump 4 is regulated to a line pressure by a pressure regulator valve (not shown). The line pressure is decompressed by a torque converter relief valve (not shown) to be regulated to a base pressure of a torque converter pressure.

A lock up mechanism incorporated with the gear pump of the invention is of a so-called two-way type wherein two oil passages (viz., the torque converter pressure passage 8 and the lock up pressure passage 9) are employed for carrying out both the supply/discharge of the operating fluid of the torque converter 2 and the lock up control of the torque converter 2.

The lock up control valve 50 is communicated with a torque converter base pressure passage 10 that extends from the torque converter relief valve (not shown), and communicated with both the torque converter pressure passage 8 and lock up pressure passage 9. The lock up control valve 50 comprises generally a spool 51, a plug 52 and a spring 53, and is so constructed that upon switch movement of the spool 51, there is provided either one of two modes, which are one mode wherein the torque converter pressure provided by reducing the torque converter base hydraulic pressure is led to the torque converter pressure passage 8 and the other mode wherein the torque converter pressure is led to the lock up pressure passage 9. Due to the switching movement of the spool 51, disengagement and engagement of the lock up clutch 20 are changed.

Figure 5:
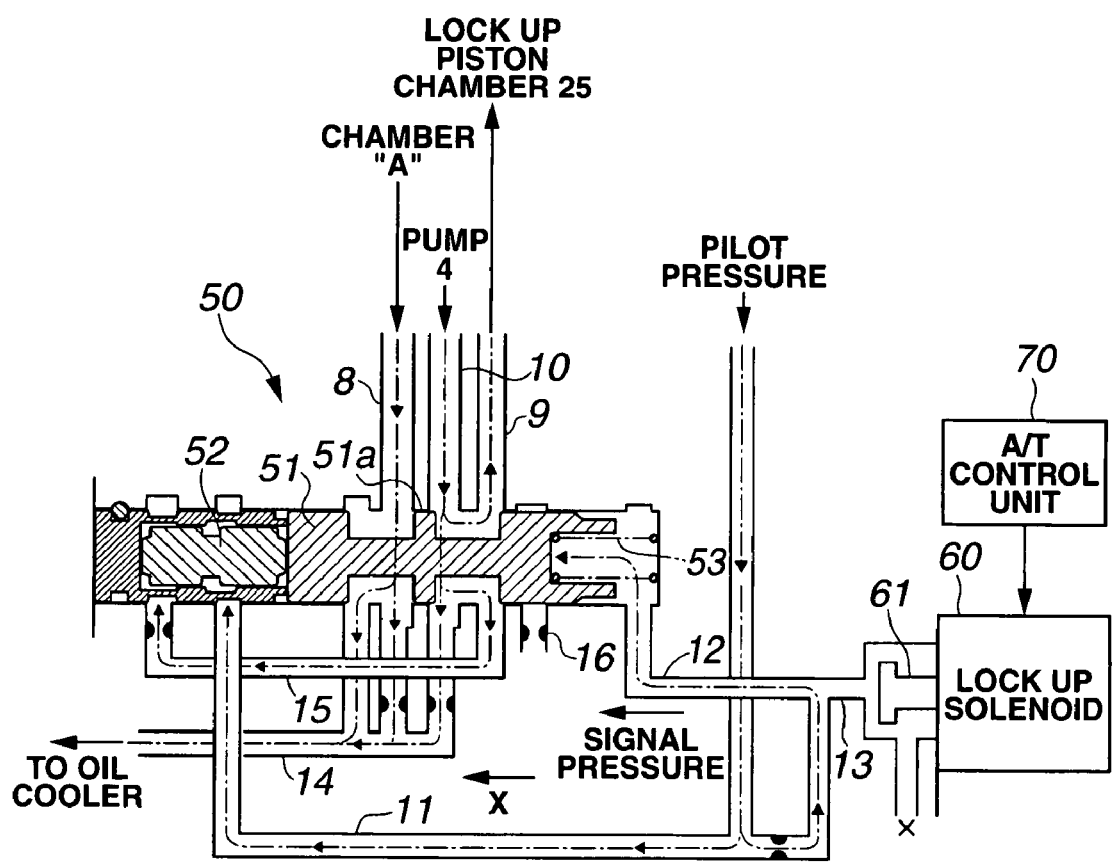
FIG. 5 is a sectional view of a lock up control valve employed in a hydraulic pressure control unit incorporated with the gear pump of the invention, in which a lock up clutch disengaging position is shown.
Figure 6:
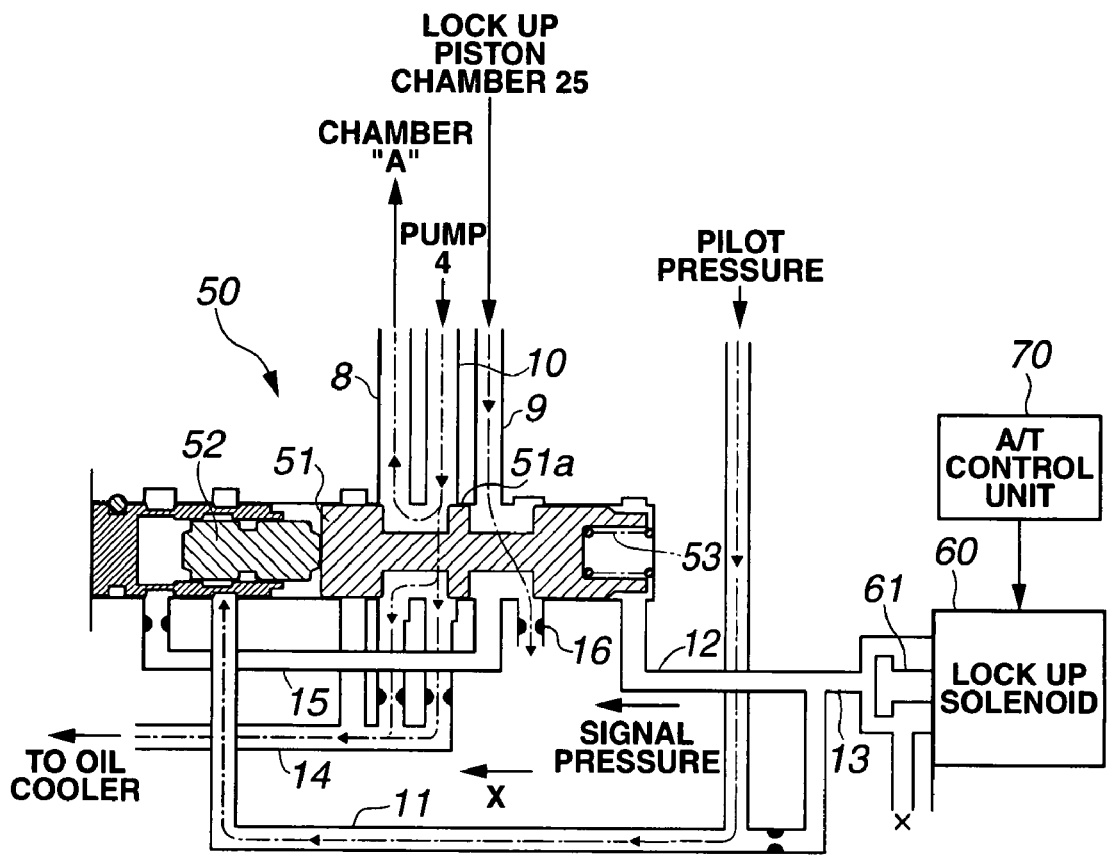
FIG. 6 is a view similar to FIG. 5, but showing a lock up clutch engaging position.

For ease of description of FIGS. 5 and 6, an axis along which the spool 51 moves will be referred to "X-axis", and a movement of the spool 51 leftward in FIGS. 5 and 6 will be referred to "leftward movement of the spool", while a movement of the spool 51 rightward in the drawings will be referred to "rightward movement of the spool". As is understood from the drawings, due to work of the plug 52, the spool 51 is pressed rightward, and at the same time, due to presence of the spring 53 and a signal pressure, the spool 51 is biased leftward. Thus, the spool 51 is moved to a position where the rightward and leftward biasing forces are balanced.

The spool 51 is formed with a land 51a. That is, when the spool 51 is moved leftward to a certain position as shown in FIG. 5, the land 51a blocks the communication between the torque converter base pressure passage 10 and the torque converter pressure passage 8, and opens the communication between the torque converter base pressure passage 10 and the lock up pressure passage 9. While, when the spool 51 is moved rightward to another certain position as shown in FIG. 6, the land 51a opens the communication between the torque converter base pressure passage 10 and the torque converter pressure passage 8, and blocks the communication between the torque converter base pressure passage 10 and the lock up pressure passage 9.

The switching of the passages 8 and 9, that is, the rightward and leftward movement of the spool 51 is controlled by the signal pressure supplied thereto through a signal pressure passage 12 from a lock up solenoid 60. As shown, the lock up solenoid 60 is equipped with a needle valve 61 by which an open/close condition of a drain passage 13 for the pilot pressure is changed thereby to regulate the signal pressure. The movement of the needle valve 61 is controlled by an instruction signal from an A/T (automatic transmission) control unit 70 in a duty control manner.

In the following, the control for disengaging the lock up clutch 20 will be described with the aid of FIG. 5 that shows a condition of the lock up control valve 50 wherein the lock up clutch 20 is disengaged.

When an instruction is issued for disengaging the lock up clutch 20, an instruction signal from the A/T control unit 70 has s such a characteristic that the off-state of the instruction signal is relatively long. When the signal is in the off-state, the needle valve 61 of the lock up solenoid 60 blocks the drain passage 13 for the pilot pressure, and thus, the signal pressure applied to the lock up control valve 50 is not lowered.

Accordingly, in such state, the signal pressure is applied to the right end of the spool 51 to bias the spool 51 leftward in FIG. 5 with the biasing force of the spring 53. With this, the torque converter base pressure passage 10 and the lock up pressure passage 9 become communicated with each other and thus the operating fluid is led into the lock up piston chamber 25. Thus, the lock up piston 21 is moved away from the converter cover 1b thereby disengaging the lock up clutch 20.

The operating fluid led to the lock up piston chamber 25 is led through a passage 9g (see FIG. 1), which is defined around the lock up piston 21, to a clearance 9h, which is defined between the pump impeller 2a and the turbine runner 2b, and to a chamber "A", which is enclosed by the pump impeller 2a and the turbine runner 2b, to serve as a working fluid for the torque converter 2. The working fluid working for the torque converter 2 is returned through the torque converter pressure passage 8 to the lock up control valve 50 and drained to an oil cooler (not shown) through a drain passage 14.

In the following, the control for engaging the lock up clutch 20 will be described with the aid of FIG. 6 that shows another condition of the lock up control valve 50 wherein the lock up clutch 20 is engaged.

When an instruction is issued for engaging the lock up clutch 20, the instruction signal from the A/T control unit 70 has such a characteristic that the on-state of the instruction signal is relatively long. When the signal is in the on-state, the needle valve 61 of the lock up solenoid 60 opens the drain passage 13 for the pilot pressure, and thus, the signal pressure applied to lock up control valve 50 is lowered.

Accordingly, in such state, the signal pressure applied to the right end of the spool 51 to bias the spool leftward in FIG. 5 is lowered, and thus, the spool 51 is moved rightward by both the torque converter base pressure that is applied to the plug 52 through a passage 15 and the pilot pressure that is applied to the plug 52 through the passage 11. With this, the torque converter base pressure passage 10 and the torque converter pressure passage 8 become communicated with each other and thus the operating fluid is led into the chamber "A" of the torque converter 2. Thus, the lock up clutch 20 becomes engaged.

That is, in such case, the operating fluid is led into the chamber "A" and the lock up pressure passage 9 is in communication with a drain passage 16, and thus, the operating fluid is discharged from the lock up piston chamber 25 through the lock up pressure passage 9. Accordingly, the internal pressure including a part induced by a centrifugal force produced when the torque converter 2 is turned is applied to the lock up piston 21 and thus the lock up piston 21 is pressed against the converter cover 1b thereby engaging the lock up clutch 20.

During the time when the operating fluid is supplied to the chamber "A" from the lock up control valve 50, part of the operating fluid that overflows the chamber "A" is drained to the oil cooler (not shown) through the drain passage 14.

For controlling the engaging/disengaging operation of the lock up clutch 20, a so-called slip lock up mode and a so-called smooth lock up mode are employed by the lock up mechanism.

Under the slip lock up mode, a differential pressure between the hydraulic pressure in the chamber "A" of the torque converter 2 and the hydraulic pressure in the lock up piston chamber 25 is adjusted in accordance with the engine torque. With this mode, the engaging force of the lock up clutch 20 is controlled to have a so-called half-clutch condition thereby to suppress undesired vibration of the torque converter 2 and undesired engine stopping.

Under the smooth lock up mode, the off-state of the instruction signal fed to the lock up solenoid 60 from the A/T control unit 70 is suitably controlled thereby adjusting the differential pressure between the chamber "A" of the torque converter 2 and the lock up piston chamber 25. With this, the engaging force of the lock up clutch 20 is controlled to have the half-clutch condition thereby to lower or minimize undesired engaging shock.

Figure 8:
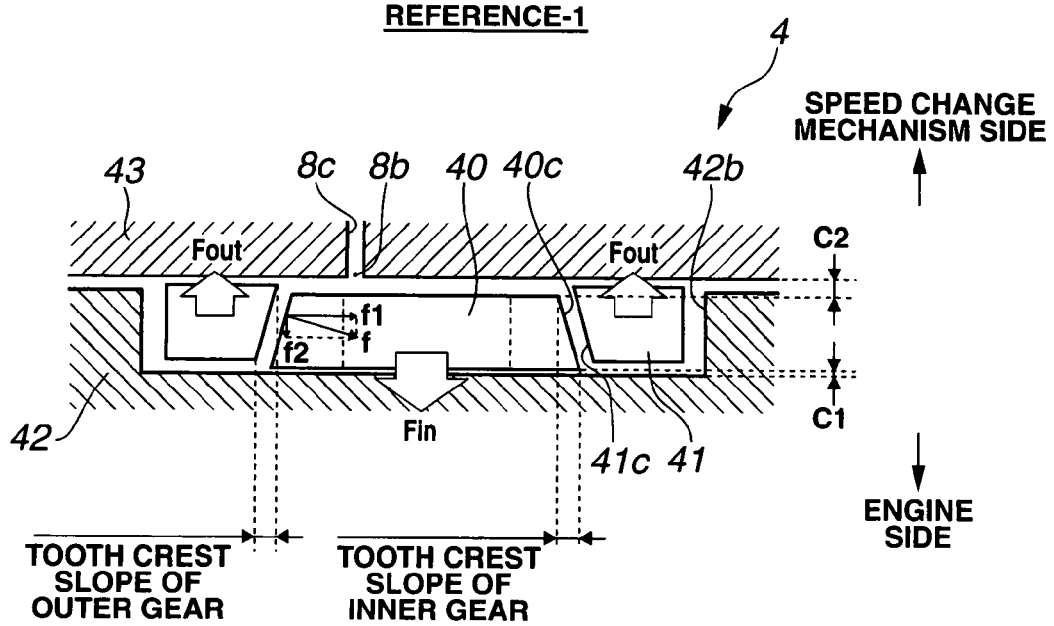
FIG. 8 is a view similar to FIG. 7, but showing a first reference arrangement of inner and outer gears.
Figure 9:
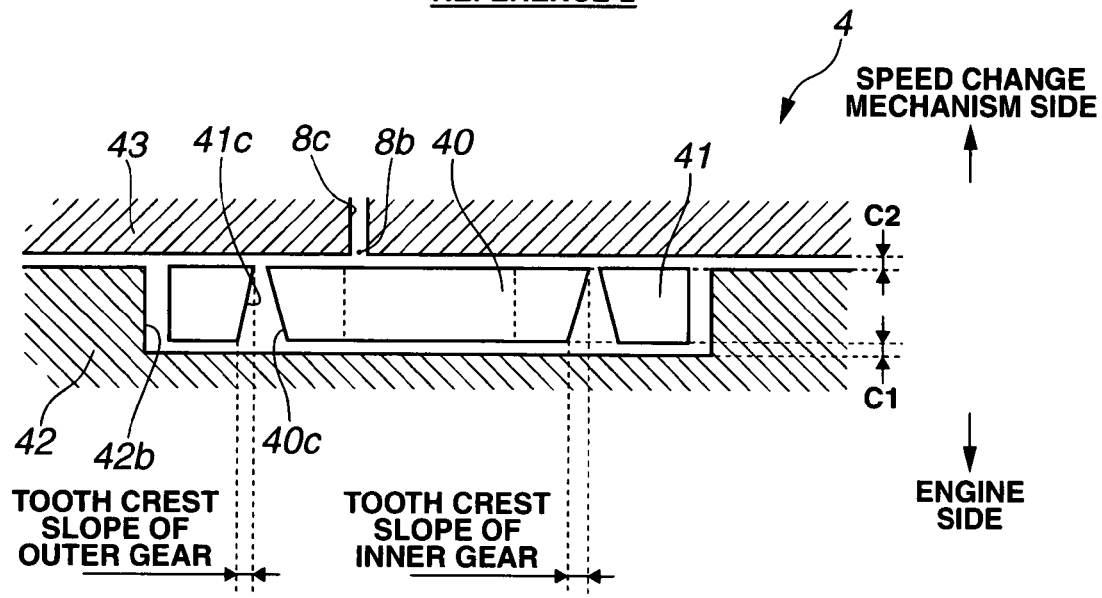
FIG. 9 is a view similar to FIG. 7, but showing a second reference arrangement of inner and outer gears.
Figure 10:
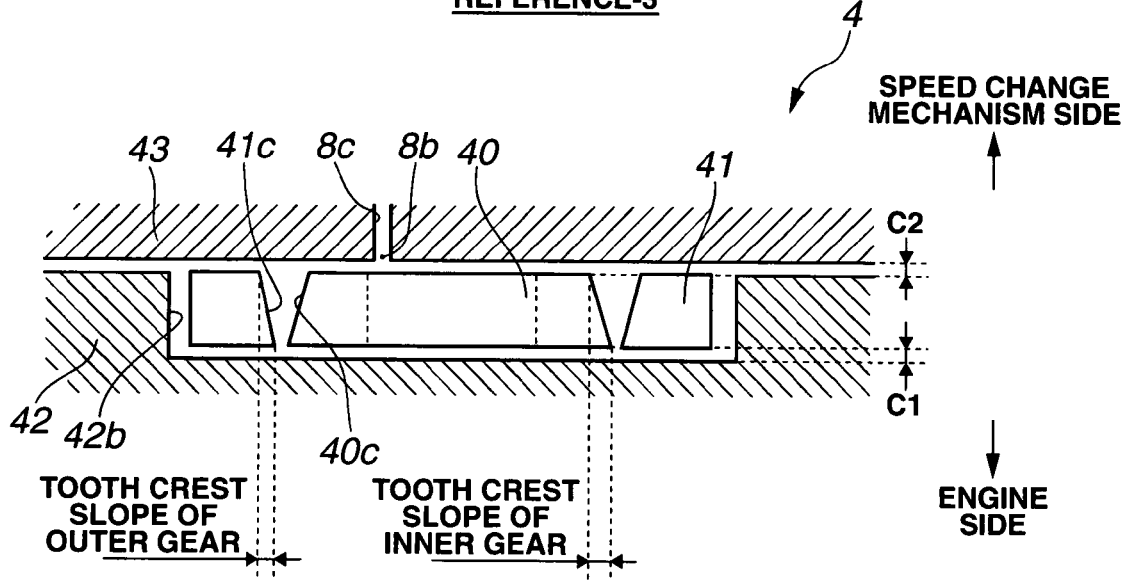
FIG. 10 is a view also similar to FIG. 7, but showing a third reference arrangement of inner and outer gears.

In the following, a unique arrangement of the inner and outer gears 40 and 41 of the gear pump of the invention will be described with reference to FIG. 7. For clarifying the unique arrangement of the gears 40 and 41, three reference arrangements are provided which are shown by FIGS. 8 to 10.

Figure 7:
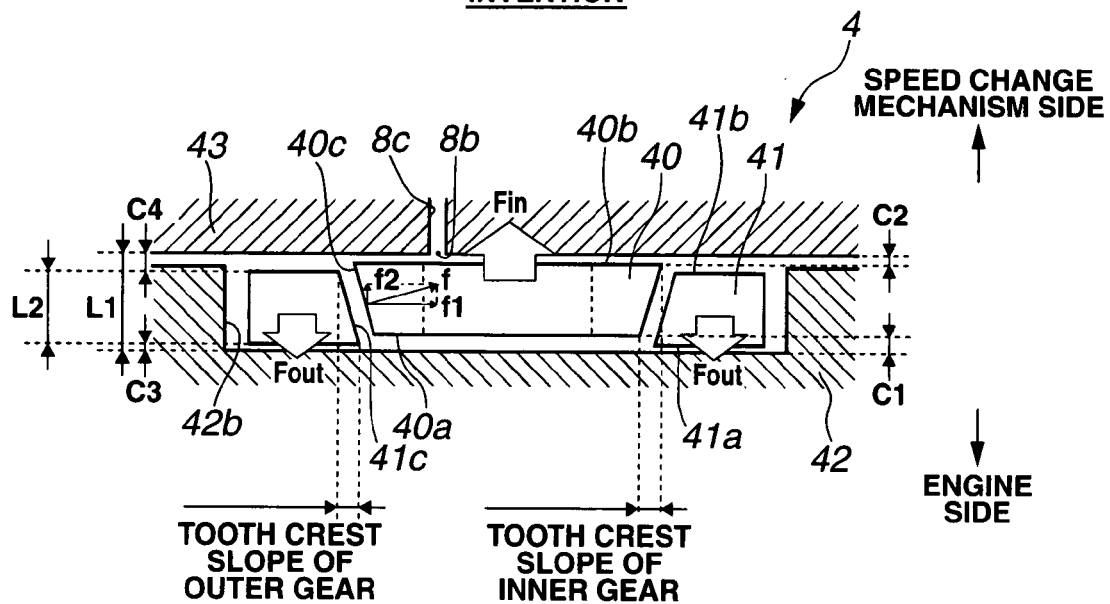
FIG. 7 is an enlarged sectional view of a part of the gear pump of the invention, in which an arrangement of the inner and outer gears is shown.

As is seen from FIG. 7, the inner gear 40 and the outer gear 41 are operatively installed in the gear receiving recess 42b formed in the pump housing 42, the recess 42b being closed by an inner surface of the pump cover 43. As shown in the drawing, the distance "L1" between a bottom surface of the recess 42b and the inner surface of the pump cover 43 is slightly larger than the face width "L2" of each tooth of the gear 40 or 41.

Accordingly, there is defined a slight clearance "C1" between one annular surface 40a (which faces the engine) of the inner gear 40 and an inner surface of the pump housing 42 except an area where the inlet and outlet ports 6 and 7a are provided (see FIG. 3). Furthermore, there is defined another slight clearance "C2" between one annular surface 40b (which faces the speed change mechanism 3) and an inner surface of the pump cover 43 except the area where the inlet and outlet ports 6 and 7a are provided. Similarly, between one annular surface 41a (which faces the engine) of the outer gear 41 and the inner surface of the pump housing 42, there is defined a slight clearance "C3" except the area where the inlet and outlet ports 6 and 7a are provided, and between the other surface 41b (which faces the speed change mechanism 3) of the outer gear 41 and the inner surface of the pump cover 43, there is defined another slight clearance "C4" except the area where the inlet and outlet ports 6 and 7a are provided.

The passage part 8c of the torque converter pressure passage 8 formed in the pump cover 43 is exposed to the gear receiving recess 42b at the end 8b and thus, as is seen from FIG. 1, the passage part 8c is communicated with the passage part 8a of the torque converter pressure passage 8 that is defined inside the pump driving shaft 2f. Part of the highly compressed operating fluid produced by the pump 4 is forced to flow or leak from the outlet port 7a to the clearance "C2" and then to the torque converter pressure passage 8 that shows a lower pressure. That is, the operating fluid that leaks is led to the torque converter pressure passage 8. As has been mentioned hereinabove, the amount of the leak is proportional to the cube of the size of the clearance "C2".

The inner and outer gears 40 and 41 are cast from a sintered metal, and a sizing process is applied to the gears for finishing the same. Because of the nature of the casting, the tooth surface 40c or 41c of each tooth of the inner or outer gear 40 or 41 is slightly inclined relative to the axis of the pump driving shaft 2f. The inclination of the tooth surface 40c or 41c will be referred to as tooth crest slope. The tooth crest slope is about 5 to 30 μm per 10 mm in face width.

As is seen from FIG. 7, when the inner and outer gears 40 and 41 are arranged so that respective tooth crest slopes 40c and 41c of the teeth of the inner and outer gears 40 and 41 are in parallel to each other, a so-called surface to surface contact takes place between the tooth surface 40c of the inner gear 40 and the tooth surface 41c of the outer gear 41 at the mutually meshed portions of the gears 40 and 41. Under such condition, the tooth surface 40c of the inner gear 40 is applied with a certain force "f" at the mutually meshed portions, that functions to bias the inner gear 40 in a certain direction. Because the nature of the tooth crest slope of the inner gear 40, the force "f" is divided into two components, one being a component "f1" in a radial direction of the gear 40 and the other being a component "f2" in an axial direction of the gear 40.

The mutual meshing between the two gears 40 and 41 is mainly made at and near a bottom dead center. That is, such meshing is not made at an upper dead center. The component "f1" generated at the bottom dead center is absorbed by the hydraulic pressure generated at the upper dead center. However, due to existence of the component "f2", the inner gear 40 is entirely applied with a thrust load "Fin" in one axial direction. Similarly, the outer gear 41 is entire applied with a thrust load "Fout" in the other axial direction. Due to existence of the thrust loads "Fin" and "Fout", the inner gear 40 and the outer gear 41 are biased to move away from each other in an axial direction by a distance determined by the above-mentioned clearances "C1", "C2", "C3" and "C4".

As seen from FIG. 7, upon assembly of the gear pump 4 of the invention, the tooth crest slope of each tooth of the inner gear 40 and that of the outer gear 41 are arranged in parallel with each other and the inner gear 40 is applied with the thrust load "Fin".

Due to the work of the thrust load "Fin", the inner gear 40 is biased to move toward the pump cover 43 increasing the clearance "C1" and decreasing the clearance "C2". Due to the work of the thrust load "Fout", the outer gear 41 is biased to move toward the pump housing 42 while decreasing the clearance "C3" and increasing the clearance "C4".

Because, as has been mentioned hereinabove, the amount of the operating fluid that leaks to the torque converter pressure passage 8 through the clearance "C" is proportional to the cube of the size of the clearance "C2", the decrease of the clearance "C2" due to the axial movement of the inner gear 40 induces that the leak amount of the operating fluid is reduced in proportion to the cube of the reduction amount ΔC2 of the operating fluid. In other words, the leak amount of the operating fluid that flows in the clearance "C2" is greatly reduced. Accordingly, the amount of operating fluid that is discharged from the outlet ports 7a and 7b is greatly increased.

Decreasing the clearance "C2" induces increasing of the opposite clearance "C1". However, as is seen from FIG. 1, the portion that communicates with the clearance "C1" is a very small clearance defined by a bush 42d and a clearance defined between the pump driving shaft 2f and the bore wall of the inner gear 40. Thus, the portion to which the operating fluid flows through the clearance "C1" has a marked flow resistance, and thus the leak amount of the operation fluid through the clearance "C1" is small. In other words, the amount of reduction of the leak that is induced by decreasing the clearance "C2" is sufficiently larger than the amount of increase of the leak that is induced by increasing the clearance "C1".

Accordingly, by the movement of the inner gear 40 toward the pump cover 43, the amount of the leak is greatly reduced.

Since the inner and outer gears 40 and 41 are assembled so that the respective tooth crest slopes 40c and 41c of the teeth of the gears 40 and 41 are in parallel with each other, the mutual engagement between the crest slopes 40c and 41c is readily made with a smoothed break-in operation. Thus, the break-in time of the pump 4 can be reduced.

FIG. 8 shows a first reference arrangement of the inner and outer gears 40 and 41, which is provided for clarifying the unique and advantageous arrangement of the inner and outer gears 40 and 41 of the above-mentioned gear pump 4 of the present invention.

As is seen from the drawing, in this reference arrangement, the respective tooth crest slopes 40c and 41c of the teeth of the inner and outer gears 40 and 41 are in parallel to each other. However, unlike the case of the invention, the arrangement of this first reference is so made that the thrust load "Fin" produced in the internal gear 40 when the inner and outer gears 40 and 41 are meshed is applied in the direction toward the engine. Accordingly, the amount of leak of the operating fluid is increased.

That is, due to the work of the thrust load "Fin", the inner gear 40 is biased to move toward the pump housing 42 thereby decreasing the clearance "C1" and increasing the clearance "C2". As has been mentioned hereinabove, the size of the clearance "C1" does not largely affect the amount of leak. However, the size of the other clearance "C2" largely affects the amount of leak. That is, when the size of the clearance "C2" is enlarged, the operating fluid is led or leaked to the torque converter pressure passage 8 through the clearance "C" that shows only a small flow resistance. The amount of leak is increased in proportion to the cube of the increased amount $\Delta C2$ in the clearance "C2". That is, due to the marked increase of the amount of leak through the clearance "C2", the amount of the operating fluid discharged from the outlet ports 7a and 7b of the pump 4 is markedly reduced.

FIG. 9 shows a second reference arrangement of the inner and outer gears 40 and 41, which is also provided for clarifying the unique and advantageous arrangement of the inner and outer gears 40 and 41 of the gear pump 4 of the invention.

As is seen from the drawing, in this reference arrangement, the respective tooth crest slopes 40c and 41c of the teeth of the inner and outer gears 40 and 41 are not in parallel to each other.

In this arrangement, the so-called surface to surface contact does not take place between the tooth surface 40c of the inner gear 40 and the tooth surface 41c of the outer gear 41 at the mutually meshed portion. Accordingly, the above-mentioned thrust loads "Fin" and "Fout" are not substantially produced. Accordingly, the inner gear 40 is not applied with an axial force, and thus, the clearances "C1" and "C2" show no change in size. This means that the amount of leak of the operating fluid through the clearance "C2" is larger than that of the unique arrangement of the invention of FIG. 7, and thus the amount of the operating fluid discharged from the outlet ports 7a and 7b of the pump 4 is lowered with respect to the case of the invention.

FIG. 10 shows a third reference arrangement of the inner and outer gears 40 and 41, which is also provided for clarifying the unique and advantageous arrangement of the inner and outer gears 40 of the gear pump 4 of the invention.

As is seen from the drawing, the arrangement of this third reference is substantially the same as the above-mentioned second reference arrangement except the orientation of the gears 40 and 41. Of course, the above-mentioned thrust loads "Fin" and "Fout" are not substantially produced, and thus the amount of leak of the operating fluid through the clearance "C2" is larger than that of the arrangement of the invention and thus the amount of the operating fluid discharged from the outlet ports 7a and 7b of the pump 4 is lowered with respect to the case of the invention.

The effect for reducing the leak of the gear pump 4 of the invention (which will be called "leak reducing effect" in the following) is marked as the differential pressure between the discharge pressure of the pump 4 and the pressure in the torque converter pressure passage 8 is high. That is, when such differential pressure is small, the amount of the operating fluid that flows through the clearance "C2" is small and thus, even when the clearance "C2" is reduced, the leak reducing effect is small. While, when the differential pressure is large, the amount of the operating fluid flowing through the clearance "C2" is large, and thus when the clearance "C2" is increased, the leak reducing effect is increased. Thus, the amount of the operating fluid discharged by the pump 4 is effectively increased.

The leak reducing effect of is marked when the pump 4 is at a lower rotation speed. That is, when the pump 4 is at a higher rotation speed, the amount of delivery is large and thus the leak does not largely affect the fluid delivery of the pump 4. In this case, the leak reducing effect is poor even when the clearance "C2" is reduced. While, in case wherein the pump 4 is at a lower rotation speed, the amount of delivery is small, and thus in this case, the leak largely affects the fluid delivery. Accordingly, when, with the pump 4 running at the lower rotation speed, the clearance "C2" is reduced, the fluid delivery of the pump 4 can be effectively increased.

According to several experiments, the inventors have found that when, with the sum of the clearances "C1" and "C2" being 50 µm, the discharge pressure of the pump 4 is 1 MPa, there appears a difference of the fluid delivery of at max 1 l/min between the pump 4 of the invention and the pump of the first reference arrangement. That is, the gear pump 4 of the invention can exhibit a sufficient fluid delivery even when the sum of the clearances "C1" and "C2" is large.

It may be thought that if the clearances "C1" and "C2" are reduced in size to increase the fluid delivery, the sliding resistance between the inner gear 40 and the pump cover 43 and that between the outer gear 41 and the pump housing 42 are increased thereby to increase the torque needed for driving the pump 4. However, even when the clearances "C1" and "C2" are reduced in size, the clearances "C1" and "C2" still keep therein the operating fluid and thus undesired metal-to-metal contact does not occur and thus undesired increase in toque needed for driving the pump 4 is not induced.

In the following, steps for assembling the gear pump 4 of the invention will be described with reference to FIG. 4.

As is understood from FIG. 7, the inner gear 40 and the outer gear 41 are installed in the gear receiving space 42b defined by both the pump housing 42 and the pump cover 43. The installation is so made that the respective tooth crest slopes 40c and 41c of the teeth of the inner and outer gears 40 and 41 are in parallel to each other and the thrust load "Fin" is applied in the direction of the speed change mechanism 3.

That is, upon assembly, both the larger diameter surface 40b of the inner gear 40 and the surface 41b of the outer gear 41 that has a larger diameter side of the central bore thereof face the speed change mechanism 3.

Referring back to FIG. 4, there is shown an inside view of the gear pump 4 that is taken from the side of the engine with the pump housing 42 removed. As is seen from the drawing, positioning marks "α" are printed on given portions of the annular surface 40a of the inner gear 40, and positioning marks "β" are printed on given portions of the annular surface 41a of the outer gear 41. With the aid of such positioning marks "α" and "β", the inner and outer gears 40 and 41 are properly and speedily installed in the right positions of the gear receiving recess 42b.

As is seen from FIG. 3, the pump cover 43 is formed with the outlet port 7a that is exposed to the side of the engine. The outlet port 7a has an extension part 70a. As shown, a leading portion 71a of the extension part 70a has a width "w1'" that is smaller than a width "w1" of a major part of the extension part 70a. The leading portion 71a is provided at an axially inside part of the outlet port 7a. Accordingly, as is understood from FIG. 4, a part of the outlet port 7a that is overlapped with the teeth of the inner gear 40 but not overlapped with the teeth of the outer gear 41 has a smaller open area. Thus, the pressure receiving area of the inner gear 40 is reduced by a degree corresponding the area of the leading portion 71a, and thus, as compared with a case wherein the open area of the outlet port 7a and that of the extension part 70a are the same in both the pump housing 42 and the pump cover 43, the force that biases the inner gear 40 in a direction from the pump cover 43 toward the pump housing 42 is lowered.

Figure 11:
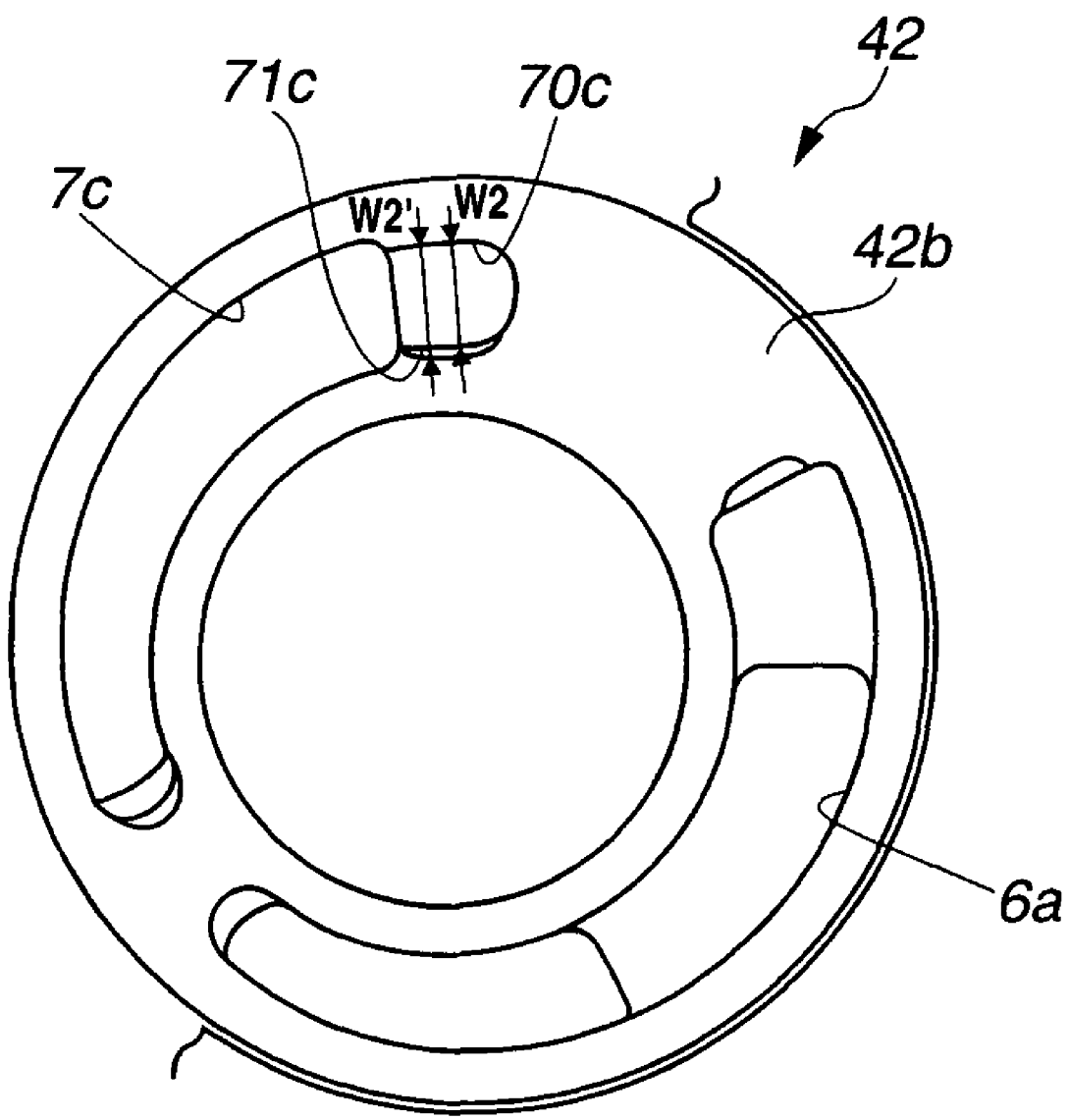
FIG. 11 is a view of a gear receiving portion of the pump housing that is taken from the side of the speed change mechanism.

FIG. 11 is a view of the gear receiving space 42b of the pump housing 42 taken from the side of the speed change mechanism 3. As shown, to the gear receiving space 42b, there is exposed the outlet port 7c at a position that corresponds to the axial position of the outlet port 7a of the pump cover 43. Furthermore, to the gear receiving space 42b, there is exposed the inlet port 6a at a position that corresponds to the axial position of the inlet port 6 of the pump cover 43.

As is seen from the drawing, a leading portion 70c of the outlet port 7c of the pump housing 42 has a width "w2'" that is smaller than a width "w2" of the major part 71c of the leading portion 70c. A width increased portion 71c is provided at an axially inside part of the outlet port 7c. Accordingly, a part of the outlet port 7c that is overlapped with the teeth of the inner gear 40 but not overlapped with the teeth of the outer gear 41 has a larger open area. Thus, the pressure receiving area of the inner gear 40 is increased by a degree corresponding to the area of the width increased portion 71c, and thus, the force that biases the inner gear 40 in a direction from the pump housing 42 toward the pump cover 43 is increased.

As is described hereinabove, in the gear pump 4 of the invention, the widths of the outlet ports 7a and 7c of the pump cover 43 and pump housing 42 are changed in size in the above-mentioned manner, the force by which the inner gear 40 is biased in the direction from the pump housing 42 toward the pump cover 43 is increased, and thus the inner gear 40 is forced to near the pump cover 43. Thus, the clearance "C2" between the inner gear 40 and the pump cover 43 is reduced which induces a marked reduction of the fluid leak through the clearance "C2".

If desired, the inlet port 6 of the pump cover 43 may have a width increased part or the inlet port 6a of the pump housing 42 may have a width reduced part. Also in this modification, the inner gear 40 is biased to move toward the pump cover 43 thereby to reduce the clearance "C2".

In the following, advantages possessed by the gear pump 4 of the invention will be described with the aid of FIG. 7.

As is described hereinabove, upon assembly of the pump 4, the inner and outer gears 40 and 41 are arranged in such a manner that the respective tooth crest slopes 40c and 41c of the teeth of the inner and outer gears 40 and 41 are in parallel with each other in such a manner as is shown in FIG. 7, and thus between the annular surface 40b of the inner gear 40 and the inner surface of the pump cover 43, there is defined the clearance "C2" to which the end 8b of the torque converter pressure passage 8 is exposed. In operation, a so-called surface to surface contact takes place between the tooth surface 40c of the inner gear 40 and the tooth surface 41c of the outer gear 41 at the mutually meshed portions of the gears 40 and 41 thereby applying a certain force "f" to the surface 40c of the inner gear 40. As shown in the drawing and described hereinbefore, the force "f" has the axial component "f2" that is directed toward the pump cover 43. Thus, under operation, the inner gear 40 is biased to move toward the pump cover 43 thereby to reduce the thickness of the clearance "C2". Thus, the amount of leak of the operating fluid caused by the size of the clearance "C2" can be reduced and thus the gear pump 4 can exhibit a satisfied pumping performance. As is described hereinabove, the leak reducing effect is marked when the differential pressure between the discharge pressure of the pump 4 and the pressure in the torque converter pressure passage 8 is high or when the rotation speed of the pump 4 is low. Thus, when the engine is under idling and thus the pump 4 runs at a lower speed, the pump 4 exhibits a satisfied pumping performance which brings about improvement in fuel consumption of the engine. Since the respective tooth crest slopes 40c and 41c of the teeth of the inner and outer gears 40 and 41 are arranged in parallel with each other, the mutual engagement between the crest slopes 40c and 41c is readily made with a smoothed break-in operation, and thus, the break-in time of the pump 4 can be reduced.

The gear pump 4 is a pump installed in the automotive automatic transmission 1 and the torque converter pressure passage 8 is a passage for multiplying the engine torque.

Accordingly, the operating fluid conveyed from the pump 4 to various elements of the speed change mechanism 3 through passages other than the torque converter pressure passage 8 can have a satisfied amount and thus the transmission 1 can exhibit an improved automatic power transmission function.

Due to existence of the marks "α" printed on the annular surface 40a of the inner gear 40 and the marks "β" printed on the annular surface 41a of the outer gear 41, the inner and outer gears 40 and 41 can be readily installed in the right positions of the gear receiving recess 42b.

The open area of the outlet port 7c of the pump housing 42 is larger than that of the outlet port 7a of the pump cover 43.

With this, the axially opposed annular surfaces 40a and 40b of the inner gear 40 are applied with different pressure, and thus, in operation, the clearance "C2" is reduced thereby to reduce the leak of the operating fluid.

The entire contents of Japanese Patent Application 2006-106545 filed Apr. 7, 2006 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A gear pump comprising:
    a pump housing formed with a gear receiving recess;
    annular inner and outer gears installed in the gear receiving recess and having respective tooth crest slopes that are in parallel to each other;
    a pump cover coupled with the pump housing for covering the gear receiving recess, the pump cover being formed with a passage whose inner end is exposed to an inner circular opening of the inner gear through a given part of the gear receiving recess, the given part being defined between a diametrically larger surface of the inner gear and an inner surface of the pump cover; and
    a hydraulic passage that includes the passage, the inner end, the given part of the gear receiving recess and the inner circular opening of the inner gear,
    wherein the inner and outer gears are meshed with each other such that the inner gear is biased in a direction to reduce thickness of said given part of the hydraulic passage when the inner gear is rotated while turning the outer gear therearound.

2. A gear pump as claimed in claim 1, wherein the annular inner gear has bevel external teeth therearound, and the annular outer gear has bevel internal teeth, wherein part of the bevel internal teeth of the annular outer gear is meshed with part of the bevel external teeth of the annular inner gear to constitute therebetween a volume changing pump chamber.

3. A gear pump comprising:
a pump housing formed with a gear receiving recess;
a pump cover coupled with the pump housing for covering the gear receiving recess;
an annular inner gear rotatably received in the gear receiving recess, the annular inner gear having bevel external teeth formed therearound, the annular inner gear having axially opposed first and second annular surfaces which face inner surfaces of the pump housing and pump cover, respectively, the second annular surface having an area that is larger than an area of the first annular surface;
an annular outer gear rotatably received in the gear receiving recess, the annular inner gear being received in the annular outer gear, the annular outer gear having bevel internal teeth, wherein part of the bevel internal teeth of the annular outer gear is meshed with part of the bevel external teeth of the annular inner gear to constitute therebetween a volume changing pump chamber, the annular outer gear having axially exposed third and fourth annular surfaces which face the inner surfaces of the pump housing and pump cover, respectively, the fourth annular surface having an area that is smaller than an area of the third annular surface;
an inlet port exposed to the volume changing pump chamber for feeding the volume changing pump chamber with a fluid;
an outlet port exposed to the volume changing pump chamber for discharging the fluid from the volume changing pump chamber; and
a passage adapted to connect a hydraulic pressure control unit and a hydraulic pressure using device,
wherein the passage has one end exposed to a clearance defined between the second annular surface of the inner gear and the inner surface of the pump cover.

4. A gear pump as claimed in claim 3, wherein the bevel external teeth of the inner gear and the bevel internal teeth of the outer gear are meshed such that a force to bias the inner gear toward the inner surface of the pump cover is produced when the inner gear is rotated while turning the outer gear.

5. A gear pump as claimed in claim 4, wherein the passage comprises a passage part defined in the pump cover and another passage part defined by a shaft that passes through the inner gear, wherein the shaft is integral with the pump cover.

6. A gear pump as claimed in claim 3, wherein the hydraulic pressure using device is a torque converter of an automatic transmission.

7. A gear pump as claimed in claim 3, wherein the first annular surface of the annular inner gear is provided at given portions thereof with positioning marks and the third surface of the annular outer gear is provided at given portions thereof with positioning marks for facilitating assembling work of the inner and outer gears in the gear receiving recess.

8. A gear pump installed between a torque converter and a speed change mechanism of an automatic transmission, comprising:
a pump housing formed with a gear receiving recess;
a pump cover coupled with the pump housing for covering the gear receiving recess;
an annular inner gear rotatably received in the gear receiving recess, the annular inner gear being connected to an impeller shell of the torque converter through a pump driving hollow shaft, the annular inner gear having bevel external teeth formed therearound, the annular inner gear having axially opposed first and second annular surfaces which face inner surfaces of the pump housing and pump cover respectively, the second annular surface having an area that is larger than an area of the first annular surface,
an annular outer gear rotatably received in the gear receiving recess, the annular inner gear being received in the annular outer gear, the annular outer gear having bevel internal teeth, wherein part of the bevel internal teeth of the annular outer gear is meshed with part of the bevel external teeth of the annular inner gear to constitute therebetween a volume changing pump chamber, the annular outer gear having axially opposed third and fourth annular surfaces which face the inner surfaces of the pump housing and pump cover, respectively, the fourth annular surface having an area that is smaller than an area of the third annular surface;
an inlet port exposed to the volume changing pump chamber for feeding the volume changing pump chamber with a fluid;
an outlet port exposed to the volume changing pump chamber for discharging the fluid from the volume changing pump chamber; and
a torque converter pressure passage that extends between a work chamber of the torque converter and a control valve unit,
wherein the torque converter pressure passage has an open end that is exposed to a clearance between the second annular surface of the inner gear and the inner surface of the pump cover.

9. A gear pump as claimed in claim 8, wherein the bevel external teeth of the inner gear and the bevel internal teeth of the outer gear are meshed such that a force to bias the inner gear toward the inner surface of the pump cover is produced when the inner gear is rotated while turning the outer gear.

10. A gear pump as claimed in claim 8, wherein the torque converter pressure passage comprises:
a first passage part that extends from the open end to the control valve unit; and
a second passage part defined on a hollow shaft that passes through the inner gear while rotatably receiving therein an input shaft of the transmission,
wherein the hollow shaft is integral with the pump cover.

11. A gear pump as claimed in claim 10, wherein the outlet port comprises:
a first outlet port part that is defined in the pump housing; and
a second outlet port part that is defined in the pump cover in a manner to face the first outlet port part with the volume changing pump chamber left therebetween.

12. A gear pump as claimed in claim 11, wherein the open area of the first outlet port part is larger than an area of the second outlet port part.

* * * * *